F. J. OAKES.
BUSHING FOR CARRIER ROLLERS, ETC.
APPLICATION FILED JAN. 16, 1922.
1,419,892. Patented June 13, 1922.
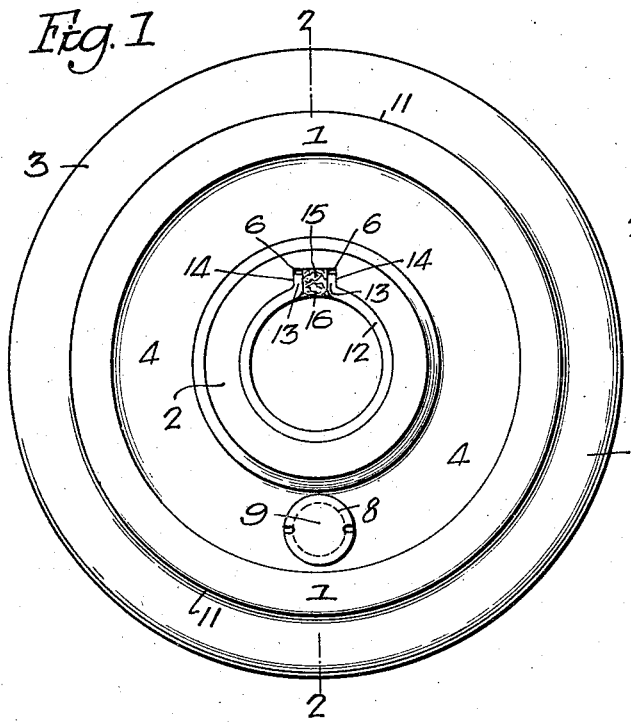
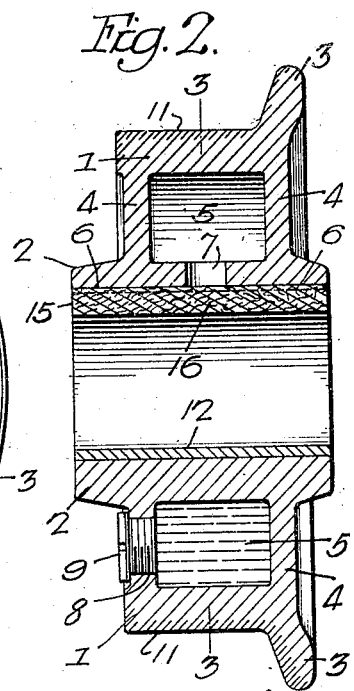
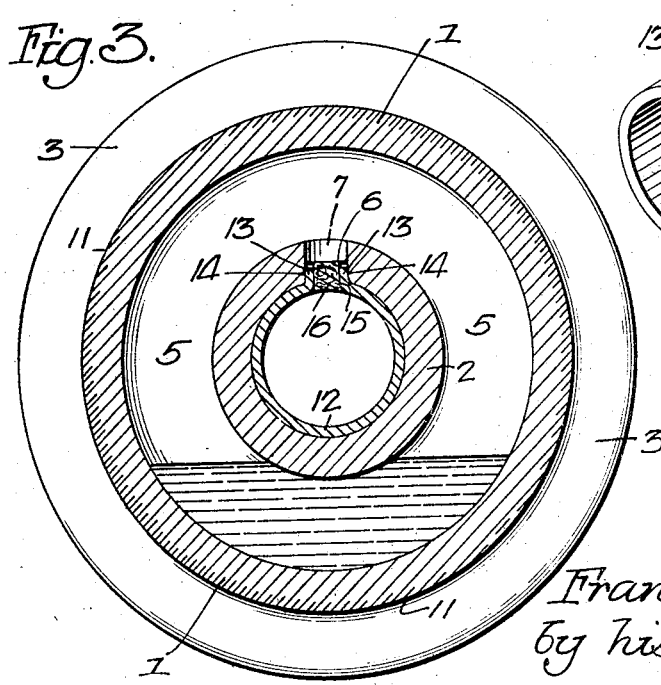
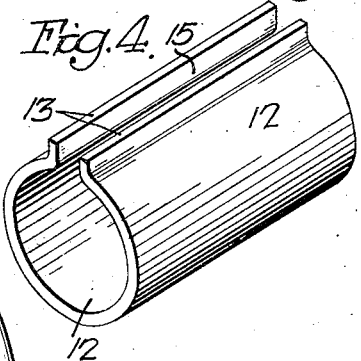
Inventor—
Frank J. Oakes.
by his Attorneys

UNITED STATES PATENT OFFICE.

FRANK J. OAKES, OF INDIANAPOLIS, INDIANA, ASSIGNOR TO LINK-BELT COMPANY, OF CHICAGO, ILLINOIS, A CORPORATION OF ILLINOIS.

BUSHING FOR CARRIER ROLLERS, ETC.

1,419,892.     Specification of Letters Patent.     Patented June 13, 1922.

Application filed January 16, 1922. Serial No. 529,556.

*To all whom it may concern:*

Be it known that I, FRANK J. OAKES, a citizen of the United States, residing in Indianapolis, Indiana, have invented certain Improvements in Bushings for Carrier Rollers, Etc., of which the following is a specification.

One object of my invention is to improve the construction of bushings, which are used particularly for carrier rollers, or wheels, and loose pulleys, and where it is desired to lubricate the bearings from a reservoir in the interior of the wheel or pulley, or from a cup secured to the wheel or pulley.

A further object of the invention is to provide a cast roller, wheel, or pulley, which has a chilled periphery, with a hard metal center, which is so arranged that a lubricant can be applied to the spindle on which the roller is mounted.

In the accompanying drawings:

Fig. 1 is a side view illustrating my invention;

Fig. 2 is a sectional view on the line 2—2, Fig. 1;

Fig. 3 is a sectional view on the line 3—3, Fig. 2; and

Fig. 4 is a perspective view of the bushing.

Referring to the drawings, 1 is the roller made of cast metal having a hub 2 and a flange 3. 4 are the webs of the roller, which are made solid and enclose a chamber 5 for lubricant. The hub has a longitudinal slot 6 therein extending from one side of the roller to the other, as shown clearly in Fig. 2. This slot is connected by a passage 7 with the chamber 5 within the roller. 8 is a filling opening closed by a screw plug 9. The wearing surface 11 of this roller is chilled, in the present instance, while the hub is comparatively soft.

In order to prolong the life of the roller, or wheel, a bushing 12, preferably of hard steel, is inserted in the opening of the roller, or wheel, as shown. This bushing, in the present instance, is made from flat stock with the ends 13 bent at an angle so as to extend into the slot 6 in the hub of the roller. These ends 13 form a key to hold the bushing to the roller. As the bushing is made so that the ends 13 will have a tendency to bear against the outer walls 14 of the slot 6, a space 15 is left between the ends. This space is of such size that a felt strip 16, or other suitable material, can be inserted therein. This strip become saturated with oil, or other lubricant, from the chamber 5 through the passage 7 and lubricates the surface of the spindle on which the roller rotates. The diameter of the bushing is greater than the bore in which it is placed so that, when the bushing is forced into place, its elasticity will provide for variations in the diameter of the bore in which it is inserted. There will always be a space between the two ends of the bushing for the insertion of the strip 16.

It will be noticed that the slot 6 is slightly deeper than the flanged ends 13 of the bushing so as to allow clearance to permit full play for the elasticity of the bushing to cause it to fit closely to the bore.

While the invention is illustrated as applied to a flanged carrier roller, it will be understood that the invention can be applied to hand car wheels, mine car wheels, and loose pulleys, or it can be used in connection with any device in which a roller, or wheel, rotates freely on its spindle. The bushing, which, in the present instance, is made from flat stock, may be in the form of a casting.

I claim:

1. The combination of a roller, or wheel, having a bore; a slot extending from the bore into the body of the roller, or wheel and communicating with a space for lubricant; a bushing made of metal and flanged at each end, the bushing being inserted in the bore of the roller, or wheel, the flange extending into the slot and spaced apart when in position; and means, inserted in the space between the flanges, through which lubricant is transmitted to the spindle and on which the wheel is mounted.

2. The combination of a hollow roller, or wheel, providing a reservoir for lubricant; a bore extending through the hub of the roller, or wheel; a slot extending the full width of the hub and communicating with the bore and with the interior reservoir of the roller, or wheel; a hardened sheet metal bushing flanged at the ends and adapted to be forced into the bore and forming the lining thereof, the two flanged ends being spaced apart and bearing against the walls of the slot; and a strip of material located in the space between the flanges of the bushing and through which the lubricant is transmitted from the reservoir to the surface of a spindle on which the roller, or wheel, is mounted.

3. The combination of a roller having a bore; a slot extending from the bore into the body of the roller; a metallic bushing flanged at each end, the bushing being inserted in the bore of the roller and the flanges extending into the slot and spaced apart when in position; and means for holding a lubricant located in the slot between the flanges of the bushing.

FRANK J. OAKES.